(12) United States Patent
Danielmeier et al.

(10) Patent No.: US 6,384,175 B1
(45) Date of Patent: May 7, 2002

(54) POLYISOCYANATE MIXTURES CONTAINING ACYLUREA GROUPS

(75) Inventors: Karsten Danielmeier, Bethel Park, PA (US); Hans-Josef Lass, Köln (DE); Martin Brahm, Odenthal (DE); Raul Pires, Leverkusen (DE); Karl-Ludwig Noble, Bergisch Gladbach (DE); Robert Reyer, Töisvorst (DE); Burkhard Blümel, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/785,091

(22) Filed: Feb. 15, 2001

(30) Foreign Application Priority Data

Feb. 21, 2000 (DE) .......................................... 100 07 820

(51) Int. Cl.[7] .............................................. C08G 18/75
(52) U.S. Cl. ...................... 528/73; 544/222; 252/182.2; 252/182.22
(58) Field of Search .......................... 252/182.2, 182.22; 528/73; 544/222

(56) References Cited

U.S. PATENT DOCUMENTS

| | | | |
|---|---|---|---|
| 4,670,100 A | 6/1987 | Henning et al. | 162/135 |
| 5,252,696 A | 10/1993 | Lass et al. | 528/49 |
| 5,914,383 A | 6/1999 | Richter et al. | 528/59 |

FOREIGN PATENT DOCUMENTS

| | | |
|---|---|---|
| CA | 1335990 | 6/1995 |

Primary Examiner—Rachel Gorr
(74) Attorney, Agent, or Firm—Joseph C. Gil; Thomas W. Roy

(57) ABSTRACT

The invention relates to water-dispersible polyisocyanate mixtures which is the reaction product of A) a lacquer polyisocyanate having a uretdione, isocyanurate, allophanate, biuret, iminooxadiazinedione and/or oxadiazinetrione group and prepared from monomeric diisocyanates and B) a polyalkylene oxide polyether containing at least one carboxylic acid group, wherein the polyalkylene oxide polyether is linked to the lacquer polyisocyanate through a reaction between an isocyanate group and a carboxylic acid group to form an acylated urea group or an amide bond. The invention further relates to a process for their preparation and their use as a starting component in the preparation of polyurethane plastics, in particular as crosslinking agents for water-soluble or -dispersible lacquer binders or binder components with isocyanate-reactive groups.

10 Claims, No Drawings

POLYISOCYANATE MIXTURES CONTAINING ACYLUREA GROUPS

BACKGROUND OF THE INVENTION

1. Field of the Invention

The invention relates to water-dispersible polyisocyanate mixtures containing acylurea groups, a process for their preparation, and their use as a starting component in the preparation of polyurethane plastics, in particular as crosslinking agents for water-soluble or -dispersible binders or binder components with isocyanate-reactive groups.

2. Description of the Prior Art

Water-dispersible polyisocyanates have gained importance in recent years for various fields of use and play a particular role today as crosslinking components for water-dilutable two-component polyurethane (2K PU) coating compositions. In combination with aqueous polyol dispersions, they allow the formulation of solvent-free coating systems which already cure to high-quality coatings at room temperature and are equivalent to conventional coatings in respect of resistance to solvents and chemicals or capacity for exposure to mechanical stresses. This is described for example in EP-A 358 979, EP-A 469 389, EP-A 496 210, EP-A 542 105, EP-A 543 228, EP-A 562 282, EP-A 562 436, EP-A 583 728, DE-A 41 29 951, DE-A 42 26 242, DE-A 42 26 243 or DE-A 42 26 270.

Water-dispersible polyisocyanate formulations are also important as additives for aqueous dispersion adhesives. With their aid, for example, the heat stability and water resistance of bonds between different materials can be improved considerably as explained in EP-A 61 628 and EP-A 206 059.

Water-dispersible polyisocyanates are also used as crosslinking components for aqueous dispersions in textile finishing (EP-A 560 161 or WO 95/30045), in formaldehyde-free textile printing inks (EP-A 571 867 or DE-A 195 33 218), and as auxiliary substances for wet strength treatment of paper (EP-A 564 912, EP-A 582 166, EP-A 707 113, WO 96/20309 and WO 97/04169).

Nonionic polyisocyanates, hydrophilically modified with polyethers, have also found acceptance in all these fields of use. The preparation of such water-dispersible polyisocyanates is described in a number of publications.

According to DE-A 24 15 435, for example, urethanes of organic, in particular aromatic, polyisocyanates and polyethylene glycol monoalkyl ethers containing at least 5 ethylene oxide units are surface-active substances. GB-A 1 444 933 and DE-A 29 08 844 describe their use in the preparation of stable aqueous emulsions of aromatic polyisocyanates.

Aromatic polyisocyanates hydrophilically modified by reaction with alkylene oxide polyethers are also known from EP-A 61 628 and EP-A 95 594. These products are used in the form of aqueous emulsions particularly in the adhesives sector.

EP-A 206 059 describes water-dispersible formulations of (cyclo)aliphatic polyisocyanates, specifically reaction products of polyisocyanates with mono- or polyfunctional polyalkylene oxide alcohols consisting of at least one polyether chain containing at least 10 ethylene oxide units, which are used as emulsifiers and additives for aqueous adhesives.

EP-A 516 277 describes the hydrophilic modification of specific polyisocyanates containing tertiary isocyanate groups by reaction with monofunctional polyalkylene oxide polyethers and the use of these products as a crosslinking component for aqueous coating compositions.

The polyisocyanate mixtures described in EP-B 540 985 and US-A 5 200 489, which are obtainable by urethanization of aliphatic and/or cycloaliphatic lacquer polyisocyanates with short-chain polyethylene oxide polyether alcohols having a statistical average of less than 10 ethylene oxide units, are suitable for high-quality light-fast lacquer applications.

The water-dispersible polyisocyanates based on 2,4(6)-diisocyanatotoluene (TDI) or mixtures of TDI and 1,6-diisocyanatohexane (HDI), described in EP-A 645 410 and EP-A 680 983 as crosslinking agents for aqueous wood and furniture lacquers, also contain urethanes of polyisocyanates and mono functional polyethylene oxide polyether alcohols as hydrophilic constituents.

In addition to these purely nonionically hydrophilically modified polyisocyanates containing polyether-urethanes, polyether-modified water-dispersible polyisocyanates have also been described, which additionally also contain ionic groups, for example sulfonate groups (cf. e.g. EP 703 255) or amino or ammonium groups (cf. e.g. EP-A 582 166 and EP-A 707 113) for improving the emulsifiability or to achieve special effects. Such ionically/nonionically modified polyisocyanates are generally less suitable for coating applications. They are preferably employed in environment-friendly textile finishing or as wet strength agents for paper.

In spite of their broad acceptance on the market for the most widely varying applications, the water-dispersible polyisocyanates of the prior art modified with polyetherurethanes have a number of main disadvantages.

Some water-dispersible polyisocyanates have a very high viscosity which has to be overcome during the dispersing operation, especially those that have been prepared using higher molecular weight polyether alcohols. In the case of pure polyethylene oxide polyethers with a number average molecular weight of approx. 700 or more, considerable shear forces (e g. high-speed stirrers) have to be applied to produce homogeneous aqueous dispersions. Furthermore such products, in particular at high emulsifier contents (necessary to achieve particularly finely divided dispersions which are stable to sedimentation), often tend to crystallize.

Water-dispersible polyisocyanates which can be stirred manually very easily into water to give stable dispersion and show no tendency at all towards crystallization even at high degrees of hydrophilic modification, i.e. at high contents of ethylene oxide units, can be obtained using shorter polyether chains. However, because of the relatively low molecular weight of the polyalkylene oxide polyethers both the content of isocyanate groups and the average isocyanate functionality decrease constantly with increasing degree of hydrophilic modification. For the majority of the abovementioned fields of use, for example, as crosslinking components for lacquers and coatings, highly hydrophilically modified polyisocyanates are desired that have high NCO contents and the highest possible functionality and are emulsified in a particularly finely divided form.

Furthermore, films of aqueous 2K PU coating compositions based on water-dispersible polyisocyanates modified with polyether-urethanes have poor surface-drying, detectable from a slow development of hardness, and are therefore not suitable for all applications.

An object of the present invention is to provide new water-dispersible polyisocyanate mixtures which are suitable for use in all the abovementioned fields of use of hydrophilic polyisocyanates, in particular as starting components for the preparation of polyurethane plastics, and above all as crosslinking agents for aqueous binders or binder components in coating systems, without having the disadvantages mentioned for the water-dispersible polyisocyanates of the prior art.

This object may be achieved with the polyisocyanate mixtures according to the invention which are described below in more detail and the process for their preparation. The invention is based on the surprising observation that the reaction of polyisocyanate molecules consisting of at least two diisocyanate molecules with polyalkylene oxide polyethers containing acid groups results, after elimination of $CO_2$, in water-dispersible polyisocyanate mixtures which, at significantly lower degrees of hydrophilic modification, can be stirred considerably more easily and in a more finely divided form into aqueous systems than water-dispersible polyisocyanates of the prior art in which the polyether chains are linked to the polyisocyanate via urethane bonds. The process according to the invention allows the preparation of hydrophilic polyisocyanates which are stable towards crystallization and, compared with the known polyisocyanate mixtures, which contain polyether chains, are distinguished by a higher content of isocyanate groups and a higher functionality, coupled with the same or an even better water-dispersibility, and moreover lead to a significantly improved surface-drying when used as a crosslinking component in aqueous 2K PU coatings.

The formation of isocyanate polyaddition products containing acylurea groups, e.g. by direct reaction of isocyanates with carboxylic acids or via a carbodiimide intermediate stage, is described in some publications (e.g. A. H. M. Schotman, W. J. Mijs, *Recl. Trav. Chim. Pay-Bas,* 1992, 111, 88–91; P. Babusiaux, R. Longeray, J. Dreux, *Liebigs Ann. Chem.* 1976, 487–495, German Auslegeschrift 1 230 778, DE-A 2 436 740 and the literature cited in these works). EP-A 207 414 describes the preparation of aqueous dispersions with acylurea fragments incorporated in the polymer chain. However, the person skilled in the art has not been able to obtain any concrete indication at all from any of the abovementioned publications that reaction products of polyisocyanates with polyalkylene oxide polyethers containing carboxylic acid groups prepared with elimination of $CO_2$ can be stirred more easily into water to give stable emulsions considerably and in a more finely divided form than polyisocyanate mixtures which have been prepared under urethanization conditions by the known processes of the prior art.

SUMMARY OF THE INVENTION

The present invention relates to a water-dispersible polyisocyanate mixture which is the reaction product of A) a lacquer polyisocyanate having a uretdione, isocyanurate, allophanate, biuret, iminooxadiazinedione and/or oxadiazinetrione group and prepared from monomeric diisocyanates and B) a polyalkylene oxide polyether containing at least one carboxylic acid group, wherein the polyalkylene oxide polyether is linked to the lacquer polyisocyanate through a reaction between an isocyanate group and a carboxylic acid group to form an acylated urea group or an amide bond.

The present invention also relates to a process for the preparation of a water-dispersible polyisocyanate mixture comprising the step of reacting an isocyanate group of the lacquer polyisocyanate A) with a carboxylic acid group of the polyalkylene oxide polyether B) to form an acylated urea group or an amide bond.

The invention also relates to polyurethane plastics prepared from these polyisocyanate mixtures as starting components.

Finally, it also relates to crosslinking agents for water-soluble or -dispersible binders or binder components and coating compositions comprising these polyisocyanate mixtures.

DETAILED DESCRIPTION OF THE INVENTION

Component A) has an (average) NCO functionality of 2.0 to 5.0, preferably 2.3 to 4.5, and a content of isocyanate groups of 8.0 to 27.0 wt. %, preferably 14.0 to 24.0 wt. %. The content of monomeric diisocyanates of the component A) used in the process according to the invention is preferably less than 1 wt. %, particularly preferably less than 0.5 wt. %. It contains at least one organic polyisocyanate having aliphatically, cycloaliphatically, araliphatically and/or aromatically bonded isocyanate groups.

The lacquer polyisocyanates and polyisocyanate mixtures of component A) include any polyisocyanates with uretdione, isocyanurate, allophanate, biuret, iminooxadiazinedione and/or oxadiazinetrione groups which are prepared by modification of at least two monomeric aliphatic, cycloaliphatic, araliphatic and/or aromatic diisocyanates, such as those described in J. Prakt. Chem. 336 (1994) 185–200, DE-A 16 70 666, 19 54 093, 24 14 413, 24 52 532, 26 41 380, 37 00 209, 39 00 053 and 39 28 503 or EP-A 336 205, 339 396 and 798 299.

Suitable diisocyanates for the preparation of such polyisocyanates include those having a molecular weight range from 140 to 400 with aliphatically, cycloaliphatically, araliphatically and/or aromatically bonded isocyanate groups, such as 1,4-di-isocyanatobutane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)-cyclohexane, 1-isocyanato-3,3,5-trimethyl-5-isocyanatomethylcyclohexane (isophorone-diisocyanate, IPDI), 4,4'-diisocyanatodicyclohexylmethane, 1-isocyanato-1-methyl-4(3)-isocyanatomethylcyclohexane, bis- (isocyanatomethyl)-norbomane, 1,3- and 1,4-bis-(2-isocyanato-prop-2-yl)-benzene (TMXDI), 2,4- and 2,6-diisocyanatotoluene (TDI), 2,4'- and 4,4'-diisocyanatodiphenylmethane, 1,5-diisocyanatonaphthalene or any desired mixtures of such diisocyanates.

Starting components A) are preferably polyisocyanates or polyisocyanate mixtures with exclusively aliphatically and/or cycloaliphatically bonded isocyanate groups. More preferred starting components A) are polyisocyanates and polyisocyanate mixtures having isocyanurate groups and are based on HDI, IPDI and/or 4,4'-diisocyanatodicyclohexylmethane. Most preferred starting components A) are polyisocyanates and polyisocyanate mixtures having isocyanurate groups and are based on HDI.

Component B) includes polyalkylene oxide polyethers which contain at least one carboxylic acid group and contain an average of preferably 5 to 35, particularly preferably 7 to 30 ethylene oxide units per molecule.

These can be prepared, for example, by reaction of preferably monofunctional polyalkylene oxide polyether alcohols with cyclic carboxylic acid anhydrides and/or dicarboxylic acid monochlorides; by transesterification of partly esterified carboxylic acids which are difunctional or more than difunctional; or by partial esterification of carboxylic acids which are difunctional or more than difunctional with preferably monofunctional polyalkylene oxide polyether alcohols.

Polyalkylene oxide polyethers which contain at least one carboxylic acid group (polyalkylene oxide polyethers B) which have been prepared in a different manner can also be employed in the process according to the invention.

The polyalkylene oxide polyether alcohols used for the preparation of the polyalkylene oxide polyethers B) are monofunctional polyalkylene oxide polyether alcohols which preferably contain an average of 5 to 35, particularly preferably 7 to 30 ethylene oxide units per molecule, such as are obtained in a known manner by alkoxylation of suitable starter molecules (see e.g. Ullmanns Encyclopädie der technischen Chemie, 4th edition, volume 19, Verlag Chemie, Weinheim p. 31–38).

Suitable starter molecules for the preparation of polyalkylene oxide polyether alcohols include saturated monoalcohols, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydromethylcyclo-hexane, 3-ethyl-3-hydromethyloxetane or tetrahydrofurfuryl alcohol; unsaturated alcohols, such as allyl alcohol, 1,1-dimethyl-allyl alcohol or oleyl alcohol; aromatic alcohols, such as phenol, the isomeric cresols or methoxyphenols; araliphatic alcohols, such as benzyl alcohol, anisyl alcohol or cinnamyl alcohol; secondary monoamines, such as dimethylamine, diethylamine, dipropylamine, diisopropylamine, dibutylamine, diisobutylainine, bis-(2-ethylhexyl)-amine, N-methyl- and N-ethylcyclohexylamine or dicyclohexylamine; and heterocyclic secondary amines, such as morpholine, pyrrolidine, piperidine or 1H-pyrazole.

Preferred starter molecules are saturated monoalcohols having up to four carbon atoms. Methanol and butanol are more preferred starter molecules.

Alkylene oxides which are suitable for the alkoxylation reaction include ethylene oxide and propylene oxide, which can be employed in the alkoxylation reaction in any desired sequence or also as a mixture.

The polyalkylene oxide polyether alcohols for the preparation of polyalkylene oxide polyethers B) are either pure polyethylene oxide polyether alcohols or mixed polyalkylene oxide polyether alcohols, the alkylene oxide units of which contain at least 40 mol % of ethylene oxide units, preferably at least 50 mol %. Mixed polyethylene-polypropylene glycol monobutyl ether alcohols having an average of 7 to 30, more preferably 7 to 25 ethylene oxide units are most preferred for the process according to the invention.

Suitable cyclic carboxylic acid anhydrides include succinic anhydride, maleic anhydride, phthalic anhydride, hexahydrophthalic anhydride and tetrahydrophthalic anhydride. However, carboxylic acid anhydrides and substituted cyclic carboxylic acid anhydrides such as the reaction products of a Diels-Alder reaction, for example between maleic anhydride or other en-components containing an anhydride group with cyclopentadiene or hexachlorocyclopentadiene or other suitable dienes, are also suitable. These products of the Diels-Alder reaction can optionally also be subjected to a subsequent hydrogenation of the double bond under conditions known in the art.

Suitable carboxylic acids which are difunctional or more than difunctional for the formation of polyalkylene oxide polyethers B) include succinic acid, adipic acid, isophthalic acid, phthalic acid, terephthalic acid, tetrahydrophthalic acid, hexahydrophthalic acid, trimesic acid and trimellitic acid.

The carboxylic acids which are difunctional or more than difunctional can be converted either directly under esterifying conditions or as partly esterified compounds by transesterification into the corresponding polyalkylene oxide polyethers B). In particular, the dicarboxylic acids mentioned can also be employed as mono-acid chlorides.

To further increase the functionality, polyethylene oxide polyethers B) can optionally contain further functional groups which are capable of reaction with isocyanates, for example hydroxyl groups or amino groups. Such additionally functionalized polyethylene oxide polyethers B) are employed in the process according to the invention, if at all, such that the linking of the hydrophilic reagent takes place to the extent of >50%, preferably >80%, by reaction between isocyanate and acid with formation of acylated urea groups or amide bonds.

However, those polyethylene oxide polyethers B) which contain no further isocyanate-reactive groups in addition to the carboxylic acid groups are preferred. Those polyethylene oxide polyethers B) which contain exactly one carboxylic acid group are especially preferred.

In addition to polyethylene oxide polyethers B) further compounds which are reactive towards isocyanates and have anionic or cationic groups, for example carboxylate, sulfonate or ammonium groups, or also simple polyalkylene oxide polyether alcohols, preferably monofunctional, can optionally, but less preferably, be used in minor amounts as hydrophilic builder components in the process according to the invention. Such additional hydrophilic reagents are employed in the process according to the invention, if at all, such that the linking of the hydrophilic reagents takes place to the extent of >50%, preferably to the extent of >80%, by reaction between isocyanate and acid with formation of acylated urea groups or amide bonds. Often it is observed that both amides and acylated urea are formed together.

In the process according to the invention, starting components A) and B) are reacted with one another at temperatures of 25 to 240° C., preferably 90 to 150° C., preferably starting at an NCO/COOH equivalent ratio of 1.5:1 to 400:1, such that the linking of the polyethylene oxide polyethers B) with polyisocyanate component A) takes place by reaction between NCO and COOH groups, with splitting off of $CO_2$ and proportional formation of amide or acylurea groups. The reaction between component A) and component B) is preferably carried out by initially introducing component A) into the reaction vessel, while stirring and passing in dry nitrogen, and adding component B) while stirring.

To accelerate the reaction between starting components A) and B), suitable catalysts which accelerate the reaction between NCO and COOH can optionally be used. These include the known catalysts from polyurethane chemistry such as tertiary amines, e.g. triethylamine, pyridine, methlpyridine, benzyldimethylamine, N,N-endoethylenepiperazone, N-methyl-piperidine, pentamethyldiethylene-triamine, N,N-dimethylamino-cyclohexane or N,N'-dimethyl-piperazine; or metal salts, e.g. iron(III) chloride, zinc chloride, zinc 2-ethylcaproate, tin(II) octoate, tin(II) ethylcaproate, tin(II) palmitate, dibutyltin(IV) dilaurate and molybdenum glycollate; or also carbodiimidization catalysts such as are described in the relevant literature (Dietrich et al., *Angew. Chem.* 1981, 93, 855–866), such as phospholene oxides. In this case the reaction proceeds as described by A. H. M. Schotman and W. J. Mijs, *Recl. Trav. Chim. Pay-Bas,* 1992, 111, 88–91.

These catalysts are employed in the process according to the invention, if at all, in an amount of 0.0001 to 5 wt. %, based on the total weight of the reactants.

The progress of the reaction can be monitored by, e.g., titrimetric determination of the NCO content. The reaction is terminated when the required NCO content, which results from formula [1] with complete conversion, is reached.

$$NCO [\%] = \frac{\sum eq(componentA) - 2 * \sum eq(componentB)}{amount\ component\ A\ [g] + amount\ component\ B\ [g]} * 4{,}200 \quad [1]$$

In the preferred purely thermal reaction procedure, this can be effected, for example, by cooling the reaction mixture to room temperature. In the case of the less preferred use of a catalyst, however, the reaction is in general stopped by addition of suitable catalyst poisons, for example, for carbodiimidization catalysts, the silylated acids described in DE-A 41 17 384.

In the case of the less preferred use of a carbodiimidization catalyst, the reaction can be carried out such that a portion of component A) is first converted into the corresponding carbodiimides, the catalyst is stopped by addition of a suitable catalyst poison, and component B) is then added. However, component B) can also be added together with the catalyst.

In the case of the use of another catalyst, which is also less preferred, the catalyst is preferably added to polyisocyanate component A) or subsequently to the mixture of components A) and B).

The temperatures which are used in the process according to the invention with the addition of a catalyst are usually lower than in the non-catalyzed process.

In case the polyethylene oxide polyethers B) react with the polyisocyanates with complete formation of acylated urea derivatives, the NCO functionality of the polyisocyanate mixtures can be determined mathematically from the nature and functionality of the starting components according to formula [2]. In this case, the polyisocyanates according to the invention have an average NCO functionality of preferably 2.3 to 9.9, particularly preferably 2.8 to 5.8.

$$F = \frac{\sum eq\ NCO - 2 * \sum eq\ COOH}{\sum (mol\ NCO + mol\ COOH) - 2 * \sum eq\ COOH} \quad [2]$$

The process according to the invention can optionally be carried out in a solvent which is inert to isocyanate groups. Suitable solvents include the lacquer solvents known in the art such as ethyl acetate, butyl acetate, ethylene glycol monomethyl or -ethyl ether acetate, 1-methoxypropyl 2-acetate, 3-methoxy-n-butyl acetate, acetone, 2-butanone, 4-methyl-2-pentanone, cyclohexanone, toluene, xylene, chlorobenzene, white spirit, more highly substituted aromatics (such as are commercially available, for example, under the names Solvent Naphtha, Solvesso, Shellsol, Isopar, Nappar and Diasol) carbonic acid esters (such as dimethyl carbonate, diethyl carbonate, 1,2-ethylene carbonate and 1,2-propylene carbonate), lactones (such as -propiolactone, -butyrolactone, ξ-caprolactone and ξ-methylcaprolactone), and also other solvents (such as propylene glycol diacetate, diethylene glycol dimethyl ether, dipropylene glycol dimethyl ether, diethylene glycol ethyl and butyl ether acetate, N-methyl-pyrrolidone and N-methylcaprolactam), or any desired mixtures of such solvents.

The process products according to the invention are clear, practically colorless polyisocyanate mixtures having the composition mentioned above. They can easily be dispersed in water by merely stirring, without the use of high shear forces. They have a considerably lower total content of ethylene oxide units than in the case of water-dispersible polyisocyanate mixtures of the prior art which have been exclusively prepared by urethanization with polyether alcohols. The aqueous dispersions are stable to sedimentation. The process according to the invention thus allows the preparation of highly hydrophilic polyisocyanates which are stable to crystallization and, cornpared with the polyisocyanate mixtures previously known containing polyetherurethanes, are distinguished by a higher content of isocyanate groups and a higher functionality, coupled with the same or an even better water-dispersibility.

The outstanding dispersibility at low ethylene oxide contents in compounds with high NCO contents and functionalities is an advantage in particular for the use of the polyisocyanate mixtures according to the invention in aqueous 2K PU lacquers. Highly crosslinked coatings which, in addition to a very good resistance to solvents and chemicals, in particular have an excellent water resistance because of the low content of hydrophilic groups can be obtained in this manner. Furthermore, films with better surface-drying, detectable from a better development of hardness, than with hydrophilically modified isocyanates of the prior art are formed.

Further non-hydrophilically modified polyisocyanates, in particular lacquer polyisocyanates of the abovementioned type or monomeric isocyanates of higher functionality, such as 4-isocyanatomethyl-1,8-octane-diisocyanate, can optionally also be added to the polyisocyanate mixtures prepared by the process according to the invention before emulsification.

In mixtures between polyisocyanates modified hydrophilically according to the invention, and non-modified polyisocyanates of the type mentioned by way of example, the process products according to the invention assume the function of an emulsifier for the content of non-hydrophilic polyisocyanates subsequently admixed.

The polyisocyanate mixtures according to the invention are valuable starting materials for the preparation of polyurethane plastics by the isocyanate polyaddition process.

The polyisocyanate mixtures are preferably used in the form of aqueous emulsions, which can be reacted in combination with polyhydroxy compounds dispersed in water in the context of aqueous two-component systems.

The polyisocyanate mixtures according to the invention are particularly preferably used as crosslinking agents for binders or binder components which are dissolved or dispersed in water and have isocyanate-reactive groups, in particular alcoholic hydroxyl groups, in the production of coatings. The crosslinking agent, optionally in emulsified form, can be combined here with the binders or binder components by simple stirring, before processing of the coating composition, by any desired methods or also using two-component spray guns.

Suitable lacquer binders or lacquer binder components in this context include polyacrylates dissolved or dispersed in water and containing hydroxyl groups, in particular those having a number average molecular weight range from 1,000 to 10,000, or optionally urethane-modified polyester resins containing hydroxyl groups which are dispersed in water. These also include, for example, polyurethanes or polyureas dispersed in water which can be crosslinked with polyisocyanates on the basis of the active hydrogen atoms present in the urethane or urea groups.

In the use according to the invention as a crosslinking component for aqueous lacquer binders, the polyisocyanate mixtures according to the invention are in general employed in an equivalent ratio of NCO groups to isocyanate-reactive groups of 0.5:1 to 2:1. Preferred isocyanate reactive groups are hydroxyl groups.

The polyisocyanate mixtures according to the invention can optionally also contain minor amounts of non-functional aqueous lacquer binders to achieve specific properties, for example, as an additive for improving adhesion.

The polyisocyanate mixtures according to the invention can also be employed in a form blocked with blocking agents known from polyurethane chemistry in combination with the abovementioned aqueous lacquer binders or lacquer binder components to form aqueous one-component PU storing systems. Suitable blocking agents include diethyl malonate, acetoacetic ester, acetone oxime, butanone oxime, ξ-caprolactam, 3,5-dimethylpyrazole, 1,2,4-triazole, dimethyl-1,2,4-triazole, imidazole or any desired mixtures of these blocking agents.

Suitable substrates for the aqueous coating compositions formulated with the polyisocyanate mixtures according to the invention are all substrates, including metal, wood, glass, stone, ceramic materials, concrete, rigid and flexible plastics, textiles, leather and paper, which can optionally also be provided with conventional primer coats before the coating.

Known additives in the lacquer sector, such as flow auxiliaries, colored pigments, fillers, matting agents or emulsifiers, can be incorporated in the aqueous coating compositions formulated with the polyisocyanate mixtures according to the invention.

Aqueous coating compositions formulated with the polyisocyanate mixtures according to the invention have good coating properties if dried at room temperature. However, they can also be dried under forced conditions at elevated temperature or by stoving at temperatures up to 260° C.

Because of their outstanding emulsifiability in water, which allows a homogeneous, particularly finely divided distribution in aqueous lacquer binders, the use of the polyisocyanate mixtures according to the invention as a crosslinking component for aqueous polyurethane lacquers leads to coatings with outstanding optical properties, in particular high surface gloss, flow and high transparency.

In addition to the preferred use as crosslinking components for aqueous 2K PU lacquers, the polyisocyanate mixtures according to the invention are outstandingly suitable as crosslinking agents for aqueous dispersion adhesives, leather and textile coatings or textile printing pastes, as AOX-free paper auxiliaries or also as additives for mineral building materials, for example concrete compositions or mortar compositions.

The invention is further illustrated but is not intended to be limited by the following examples in which all parts and percentages are by weight unless otherwise specified.

EXAMPLES

Starting Polyisocyanates
Polyisocyanate A1)
Polyisocyanate containing iminooxadiazinedione groups and prepared from 1,6-diisocyanatohexane (HDI) having an NCO content of 23.2%, an average functionality of 3.3 (according to GPC) and a content of monomeric HDI of 0.4%, prepared according to example 5a of EP-A 798 299 (believed to correspond to U.S. Pat. No. 5,914,383, hereby incorporated by reference).

Polyisocyanate A2)
Polyisocyanate containing isocyanurate groups and prepared from HDI having an NCO content of 21.5%, an average functionality of 3.5 (according to GPC) and a content of monomeric HDI of 0.1%, prepared according to EP-A 330 966 (example 7; believed to correspond to copending U.S. Ser. No. 08/784,875, hereby incorporated by reference).

Comparison Polyisocyanates
Comparison Polyisocyanate V1)
(The reaction procedure is analogous to that described in EP-A 540 985, believed to correspond to U.S. Pat. No. 5,252,696, hereby incorporated by reference for the formation of exclusively urethane-modified water-dispersible polyisocyanates.)

700 g (3.59 eq) polyisocyanate A2 were initially introduced into the reaction vessel at RT, while stirring and under dry nitrogen, 100 g (0.2 eq) of a monofunctional polyethylene oxide polyether alcohol started on methanol and with a number-average molecular weight of 500 g/mol were added and the mixture was then heated at 100° C. for 3 h. It was then cooled to RT, while stirring, and a virtually colorless polyisocyanate having an NCO value of 17.8% was obtained.

Wt. % polyether alcohol based on the starting components: 12.5%

NCO functionality (according to GPC): 3.3

Polyalkylene Oxide Polyethers Containing at Least One Carboxylic Acid Group
Polyalkylene Oxide Polyether-carboxylic Acid P1)

1,000 g (10 mol) succinic anhydride and 5,000 g of a monofunctional polyethylene oxide polyether alcohol started on methanol and having a number average molecular weight of 500 g/mol were heated at 160° C. under dry nitrogen until anhydride was no longer detectable by IR spectroscopy (band at 1785 $cm^{-1}$). The mixture was then subsequently stirred for a further hour and cooled. An almost colorless liquid was obtained.

Characteristic data:
Viscosity: 190 mPas
Acid number: 88.1 mg [KOH]/g [substance]

Polyalkylene Oxide Polyether-carboxylic Acid P2)
200 g (2 mol) succinic anhydride and 2,800 g of a monofunctional polyethylene oxide polyether alcohol started on butanol and having a number average molecular weight of 1,400 g/mol and a content of 48% propylene oxide units and 52% ethylene oxide units were heated at 160° C. under dry nitrogen until anhydride was no longer detectable by IR spectroscopy (band at 1785 $cm^{-1}$). The mixture was then subsequently stirred for a further hour and cooled. An almost colorless liquid was obtained.

Characteristic Data
Viscosity: 440 mPas
Acid number: 38.4 mg [KOH]/g [substance]

Polyalkylene Oxide Polyether-carboxylic Acid P3)
308.4 g (2 mol) hexahydrophthalic anhydride and 2,800 g of a monofunctional polyethylene oxide polyether alcohol started on butanol and having a number average molecular weight of 1,400 g/mol and a content of 48% propylene oxide units and 52% ethylene oxide units were heated at 140° C. under dry nitrogen until anhydride was no longer detectable by IR spectroscopy (band at 1785 $cm^{-1}$). The mixture was then subsequently stirred for a further hour and cooled. An almost colorless liquid was obtained.

Characteristic Data
 Viscosity: 544 mPas
 Acid number: 37.1 mg [KOH]/g [substance]

Example 1

700 g (3.59 eq) polyisocyanate A2 were initially introduced into the reaction vessel at 140° C., while stirring and under dry nitrogen, and 100 g (0.16 eq) polyalkylene oxide polyether-carboxylic acid P1 were added. Vigorous evolution of $CO_2$ started, which subsided after about 2 h. The mixture was stirred at the temperature until the NCO value of 17.2% determined theoretically according to formula [1] was reached. The mixture was then cooled slowly to RT, while stirring, and a virtually colorless polyisocyanate having an NCO value of 17.1% was obtained.

Wt. % polyalkylene oxide polyether-carboxylic acid based on the starting components: 12.5%

NCO functionality (according to GPC): 3.7

Example 2

700 g (3.59 eq) polyisocyanate A2 were initially introduced into the reaction vessel at 140° C., while stirring and under dry nitrogen, and 119 g (0.08 eq) polyalkylene oxide polyether-carboxylic acid P2 were added. Vigorous evolution of $CO_2$ started, which subsided after about 2 h. The mixture was stirred at the temperature until the NCO value of 17.6% determined theoretically according to formula [1] was reached. The mixture was then cooled to RT, while stirring, and a virtually colorless polyisocyanate having an NCO value of 17.5% was obtained.

Wt. % polyalkylene oxide polyether-carboxylic acid based on the starting components: 14.5%

NCO functionality (according to GPC): 3.6

Example 3

700 g (3.59 eq) polyisocyanate A2 were initially introduced into the reaction vessel at 140° C., while stirring and under dry nitrogen, and 122.8 g (0.08 eq) polyalkylene oxide polyether-carboxylic acid P3 were added. Vigorous evolution of $CO_2$ started, which subsided after about 2 h. The mixture was stirred at the temperature until the NCO value of 17.6% determined theoretically according to formula [1] was reached.

The mixture was then cooled to RT, while stirring, and a virtually colorless polyisocyanate having an NCO value of 17.6% was obtained.

Wt. % polyalkylene oxide polyether-carboxylic acid based on the starting components: 14.9%

NCO functionality (according to GPC): 3.6

Example 4

700 g (3.86 eq) polyisocyanate A1 were initially introduced into the reaction vessel at 140° C., while stirring and under dry nitrogen, and 119 g (0.08 eq) polyalkylene oxide polyether-carboxylic acid 2 were added. Vigorous evolution of $CO_2$ started, which subsided after about 2 h. The mixture was stirred at the temperature until the NCO value of 19% determined theoretically according to formula [1] was reached. The mixture was then cooled to RT, while stirring, and a virtually colorless polyisocyanate having an NCO value of 18.8% was obtained.

Wt. % polyalkylene oxide polyether-carboxylic acid based on the starting components: 14.5%

NCO functionality (according to GPC): 3.4

Example 5
(Mixture With Hydrophobic Polyisocyanate)

500 g (2.08 eq) of the polyisocyanate obtained in example 2 were mixed with 20 g (0.24 eq) 4-isocyanatomethyl-1,8-octane-diisocyanate for two hours, while stirring and under dry nitrogen. A virtually colorless isocyanate according to the invention having an NCO value of 18.7% was obtained.

Wt. % polyalkylene oxide polyether-carboxylic acid based on the starting components: 13.9%

NCO functionality (according to GPC): 3,4

Example 6
(Co-use of Polyether Alcohol)

1,000 g (5.13 eq) polyisocyanate A2 were initially introduced into the reaction vessel at 130° C., while stirring and under dry nitrogen, and 100 g (0.067 eq) polyalkylene oxide polyether-carboxylic acid P2 were added. Vigorous evolution of $CO_2$ started, which subsided after about 2 h. The mixture was stirred at the temperature until the NCO value of 19.1% determined theoretically according to formula [1] was reached. The mixture was then cooled to 70° C., while stirring, 20 g (=0.04 eq) of a monofunctional polyethylene oxide polyether alcohol started on methanol and with a number average molecular weight of 500 were added and the mixture was stirred at this temperature until the NCO value of 18.6% was reached. The mixture was then cooled to RT, while stirring, and a virtually colorless polyisocyanate having an NCO value of 18.6% was obtained.

Wt. % polyalkylene oxide polyether-carboxylic acid based on the starting components: 10.7%

NCO functionality (according to GPC): 3.5

Example 7
(Stability to Cleavage of Isocyanate)

100 g of the polyisocyanate according to the invention according to example 2 with a content of monomeric free HDI of 0.1% were heated at 50° C. for 21 d. The content of monomeric free HDI was then determined again.

Content of monomeric free HDI after storage for 21 d at 50° C.: 0.1%

Example 8
(Preparation of Emulsions)

120 g deionized water were added to 50 g portions of the polyisocyanates according to the invention from examples 1, 2, 3, 4, 5 and 6 in a conical flask and the components were converted into a finely divided, bluish-tinged emulsion by gentle manual stirring. The emulsion was still stable after a standing time of 48 h, and showed no precipitates or sediment.

Example 9
(Use)

Clear coating compositions were formulated from a stock lacquer comprising 53 parts by wt. of a polyacrylate polyol, prepared by polymerization of 16.40% methyl methacrylate, 10.87% butyl acrylate, 10.26% hydroxyethyl methacrylate and 1.04% acrylic acid in the presence of 0.87% di-tert-butyl peroxide as an initiator in Desmophen A 160 (Bayer AG), with an OH number of 99 [mg KOH/g substance (based on the solid resin)], 1.22 parts by wt. of a commercially available flow agent (Surfynol 104, Air Products N.L., 50% in butylglycol), 0.16 part by wt. of a commercially available thickener (Borchigel PW 25, Borchers, 25% in propylene glycol/water), 1.22 parts by wt. of a commercially available slip additive (Baysilone VP AI 3468:3466, 3:7, Bayer AG, 10% in 3-Methoxy-1-butylacetate (CAS 4435-53-4) and 80%–100% solutions, for example in butoxyl, of the polyisocyanate mixtures according to the invention obtained according to examples 1 and 6 and comparison polyisocyanate V1. The polyisocyanate components and the stock lacquer were each employed at an NCO/OH equivalent ratio of 1.5:1.

The clear coating formulations obtained in this way were knife-coated on to a glass plate with a film casting frame. After a short period of evaporation in air, the films were first dried in a drying cabinet at 60° C. for 30 minutes and then kept at RT for two hours. As a measure of the surface-drying of the film, its hardness according to König pendulum damping was stated (DIN 53 157).

TABLE 1

| | Polyisocyanate according to example 1 | Polyisocyanate according to example 6 | Comparison polyisocyanate V1 |
|---|---|---|---|
| Pigmentation | clear lacquer | clear lacquer | clear lacquer |
| Pendulum hardness 30 min 60° C. + 2 h | 25" | 24" | 18" |
| Transparency | 0 | 0 | 0 |
| Haze/gloss 20° | 19/85 | 20/83 | 21/84 |
| Drying 30 min 60° C. + 2 h | 1 | 1 | 2 |

Rating key for table 1: 0 = positive; 5 = negative

The resistance of the coating films obtained in this way was investigated with various solvents (tab. 2).

For this, a cotton-wool pad soaked with solvent was applied to the cured coating film and the area was covered with a watch glass. After a fixed period of time (action time), the watch glass and cotton-wool pad were removed and any remaining residues of solvent were carefully dabbed off with a cellulose cloth. The coating film segment exposed to the action of the solvent was evaluated visually.

TABLE 2

| | Polyisocyanate according to example 1 | Polyisocyanate according to example 6 | Comparison polyisocyanate V1 |
|---|---|---|---|
| Resistance to solvents 30 min 60° C. + 2 h | | | |
| Isopropanol/water 1:1 | 1 | 1 | 1 |
| Butylglycol | 2 | 1 | 2 |
| Methoxypropyl acetate/xylene 1:1 | 1 | 1 | 1 |

Rating key for table 2:
0 = film was unchanged after treatment
1 = film retained a remaining edge after treatment
2 = film could be scratched
3 = film could be scratched off
4 = film was completely destroyed Tables 1 and 2 show that the polyisocyanate according to the invention (example 1), with the same content of hydrophilic reagent as the comparison polyisocyanate V1 was distinguished by a higher initial hardness and an improved surface-drying, while all the other properties remained at the same good level.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water-dispersible polyisocyanate mixture which is the reaction product of

A) a lacquer polyisocyanate having a uretdione, isocyanurate, allophanate, biuret, iminooxadiazinedione and/or oxadiazinetrione group and prepared from monomeric diisocyanates and B) a polyalkylene oxide polyether containing at least one carboxylic acid group, wherein the polyalkylene oxide polyether is linked to the lacquer polyisocyanate through a reaction between an isocyanate group and a carboxylic acid group to form an acylated urea group or an amide bond.

2. The water-dispersible polyisocyanate mixture of claim 1 wherein the polyisocyanate component A) is a polyisocyanate containing isocyanurate groups and is prepared from 1,6-diisocyanatohexane, 1-isocyanato-3,3,5-trimethyl-5-isocyanatomethylcyclohexane and/or 4,4'-diisocyanatodicyclohexylmethane.

3. The water-dispersible polyisocyanate mixture of claim 1 wherein polyalkylene oxide polyether B) contains one carboxylic acid group.

4. The water-dispersible polyisocyanate mixture of claim 2 wherein polyalkylene oxide polyether B) contains one carboxylic acid group.

5. A process for the preparation of a water-dispersible polyisocyanate mixture comprising reacting A) an isocyanate group of a lacquer polyisocyanate having a uretdione, isocyanurate, allophanate, biuret, iminooxadiazinedione and/or oxadiazinetrione group and prepared from monomeric diisocyanates with B) a carboxylic acid group of a polyalkylene oxide polyether containing at least one carboxylic acid group, to form an acylated urea group or an amide bond.

6. The process of claim 5 wherein the reaction temperature is between 25 to 240° C.

7. The process of claim 5 further comprising initially introducing component A) into the reaction vessel, while stirring and passing in dry nitrogen, and adding component B) while stirring.

8. The process of claim 5 wherein polyisocyanate component A) is a polyisocyanate containing isocyanurate groups and is prepared from 1,6-diisocyanatohexane, 1-isocyanato-3,3,5-trimethyl-5-isocyanatomethylcyclohexane and/or 4,4'-diisocyanatodicyclohexylmethane.

9. A polyurethane plastic prepared from the polyisocyanate mixture of claim 1.

10. A coating composition comprising the polyisocyanate mixture of claim 1 and an isocyanate-reactive component.

* * * * *